May 9, 1961 R. S. SAYWELL, JR 2,983,067
FISHING FLOAT AND LINE DEPTH ADJUSTING ASSEMBLY
Filed Sept. 28, 1959 2 Sheets-Sheet 1
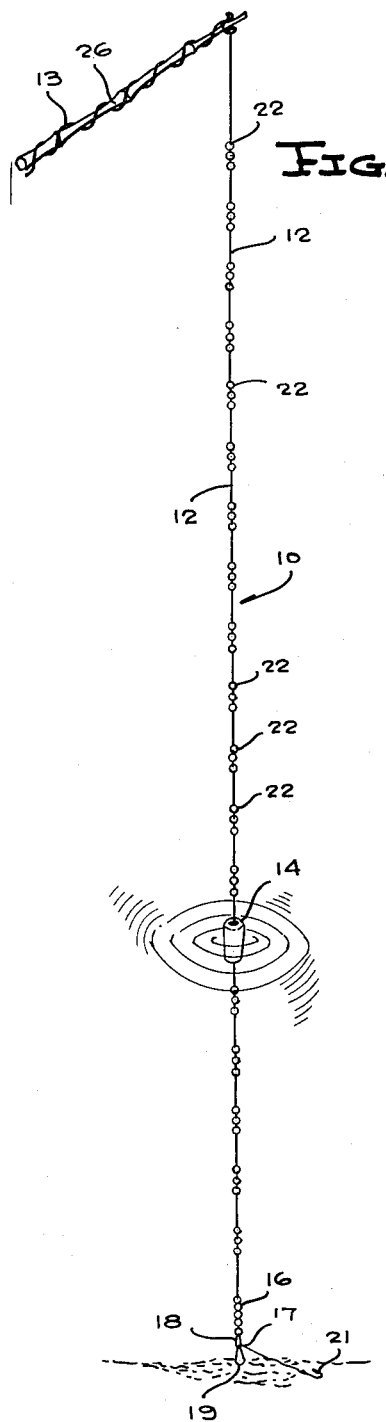
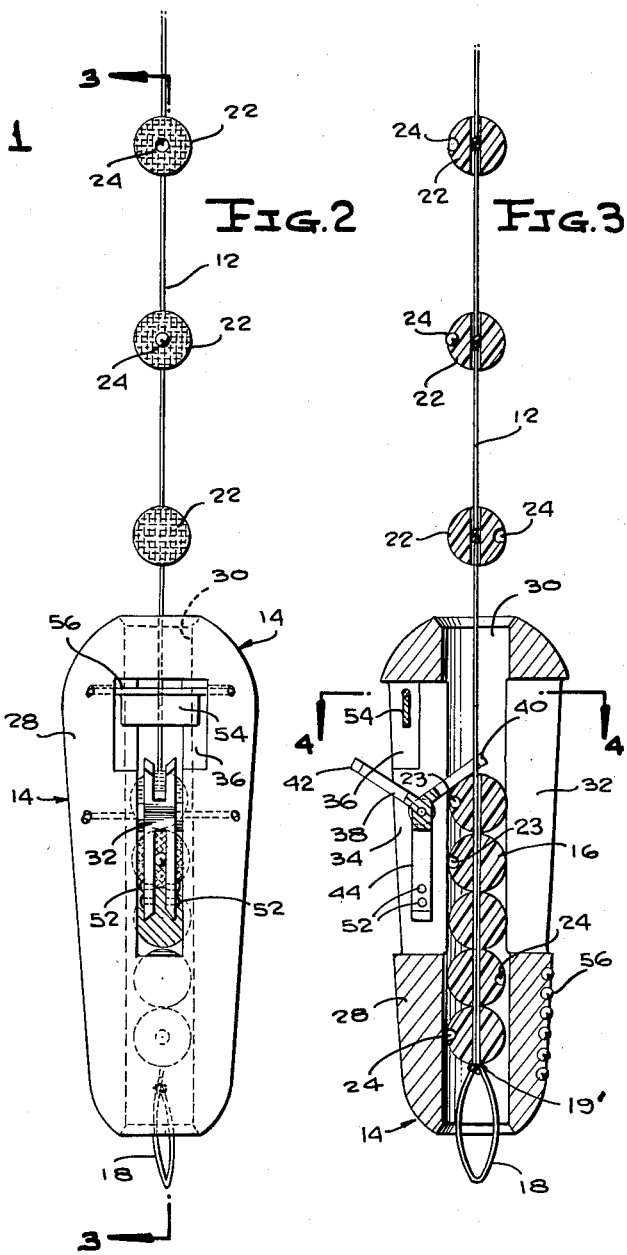
INVENTOR.
ROBERT S. SAYWELL, JR.
BY
Gustav Miller
ATTORNEY

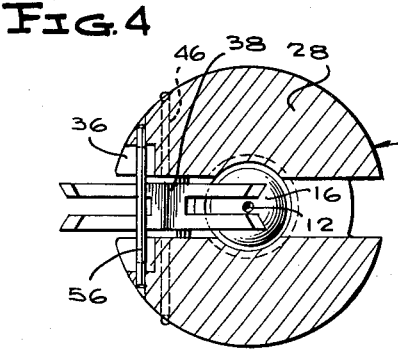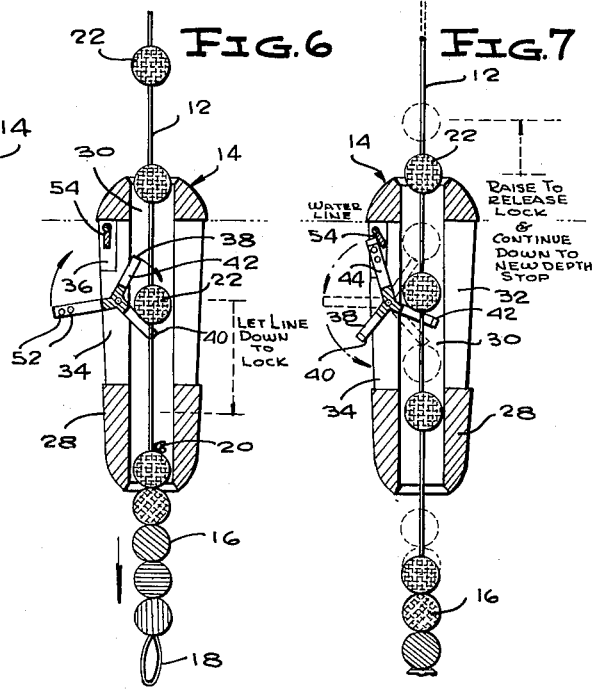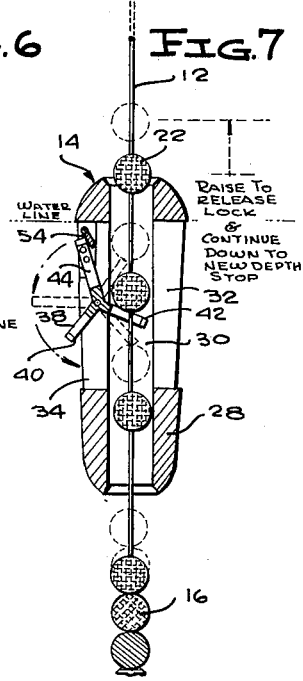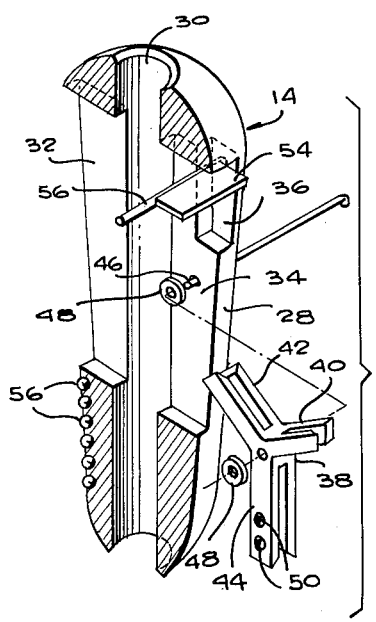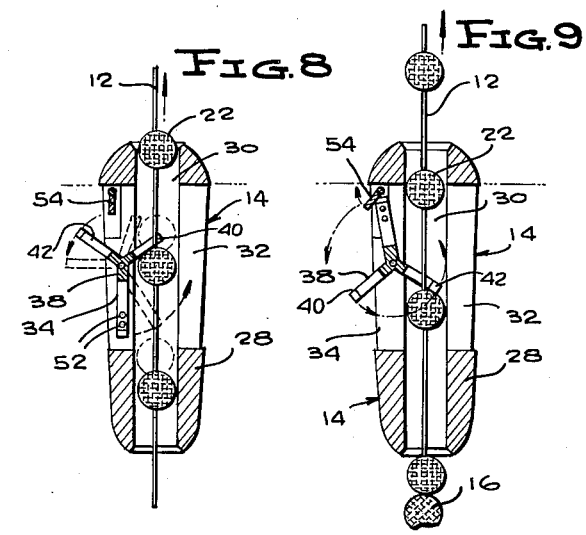

… … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … …

2,983,067
FISHING FLOAT AND LINE DEPTH ADJUSTING ASSEMBLY

Robert S. Saywell, Jr., Rte 2, Box 92, West Paducah, Ky.

Filed Sept. 28, 1959, Ser. No. 842,829

7 Claims. (Cl. 43—44.88)

This invention relates to a fishing device, and it particularly relates to an adjustable fishing float.

Heretofore, it has been the general practice to provide floats which required a great amount of manipulation in order to be adjusted on the line for the desired depth. It was generally necessary to remove the line from the water, untie knots, manually slide the float to the desired position and then retie the knots.

In order to overcome the aforesaid difficulties, various attempts were made to provide a float which could be adjustably clamped in position on the line without tying and untying knots. However, in most cases, it was still necessary to remove the float from the water to manually clamp and unclamp it to the line. Furthermore, these devices were either far too complex and expensive to be commercially feasible or were so constructed that they could not accomplish their purposes in an effective or efficient manner.

It is one object of the present invention to improve over the above-described float arrangements by providing a float and line depth adjusting assembly wherein the float can be easily and effectively adjusted along the line while the float and line are in the water.

Another object of the present invention is to provide a float and line depth adjusting assembly of the aforesaid type wherein the parts are relatively simple in construction and do not have a tendency to easily break.

Another object of the present invention is to provide a float and line depth adjusting assembly of the aforesaid type which can be readily used by any fisherman.

Other objects of the present invention are to provide an improved float and line depth adjusting assembly, of the character described, that is easily and economically produced, which is sturdy in construction, and which is highly efficient in operation.

With the above and related objects in view, this invention consists in the details of construction and combination of parts, as will be more fully introduced from the following description, when read in conjunction with the accompanying drawings in which:

Fig. 1 is a perspective view of a float and line depth adjusting assembly embodying the present invention and in operative position.

Fig. 2 is a front elevational view of the float and the adjacent portion of the line.

Fig. 3 is a sectional view taken on line 3—3 of Fig. 2.

Fig. 4 is a cross-sectional view taken on line 4—4 of Fig. 3.

Fig. 5 is a sectional, perspective exploded view of the float.

Figs. 6 to 9 are sectional views similar to Fig. 3 but showing the float in various positions during adjustment thereof on the line.

Referring in greater detail to the drawings wherein similar reference characters refer to similar parts, there is shown a float and line depth adjusting assembly generally designated 10 and comprising a line 12 and float 14.

The line 12 is preferably formed of twisted nylon twine and is provided with a series or cluster of five beads at the end, each bead of this cluster being designated 16. The end of the line 12 is looped, as at 18 and knotted as at 19' with the loop 18 being maintained by the knot 19' with the end of the line 12 doubled within the channels formed in the beads 16 and fused with heat at 20 (see Fig. 6) to preventing unraveling. The loop 18 is used for attaching the leader 17, sinker 19 and hook 21. It also acts to prevent the float 14 from leaving the line 12.

The line 12 is also provided with a series of clusters of beads 22, there being three beads in each of these clusters. The clusters of beads 22 are set one foot apart for twenty feet of line (as best seen in Fig. 1) and the three beads of each cluster are colored to denote the fishing depth. As an example, the beads in each cluster are colored as follows:

1 foot—yellow, yellow, yellow
2 feet—orange, orange, orange
3 feet—green, green, green
4 feet—blue, blue, blue
5 feet—pink, pink, pink
6 feet—pink, yellow, yellow
7 feet—yellow, orange, orange
8 feet—orange, green, green
9 feet—green, blue, blue
10 feet—blue, pink, pink
11 feet—pink, pink, yellow
12 feet—yellow, yellow, orange
13 feet—orange, orange, green
14 feet—green, green, blue
15 feet—blue, blue, pink
16 feet—yellow, yellow, yellow
17 feet—orange, orange, orange
18 feet—green, green, green
19 feet—blue, blue, blue
20 feet—pink, pink, pink The end cluster of beads 16 is colored yellow, orange, green, blue and pink.

The beads 16 and 22 are preferably made of plastic and are provided with through bores to receive the line 12. The beads 22 of each cluster are spaced one and one-half inches apart. An overhand knot is tied in the line 12 for each bead and the beads are forced over the knots which hold the beads in place.

Since the plastic beads 16 and 22 will ordinarily float, an opening or recess 23 is provided in each bead and a lead shot or BB, indicated at 24, is inserted in the recess in as many of the beads as may be necessary, as determined by test according to the material of which the float is made. This shot acts to offset the buoyancy of the beads.

The line 12 is attached at its upper end to the rod 26. The line is preferably tied to the rod 26 four inches from the small end about two feet from the last three beads 22 on the line 12. The remaining portion 13 of the unbeaded part of the line is wound around the length of the rod and tied off at the butt end. The line is taken in or let out by rotating the rod and this movement presents a moving lure to the fish.

The float 14 comprises a body 28 which is preferably constructed of hardwood although it may also be made of any other desired material such as cork, plastic or the like. The body 28 is generally cylindrical and is provided with a central passage 30 and oppositely disposed slots 32 and 34, one on each side of the passage 30. Intersecting the upper portion of slot 34 is a recess 36.

In the slot 34 is rotatably mounted a Y gear 38 having two short arms 40 and 42 and a long arm 44. Each arm is slotted to permit access of the line 12 while the entire Y gear is rotatably mounted on a pin 46 between washers 48 (see Fig. 5). The long arm 44 is provided with tapped holes 50 to receive screws 52. These screws 52 are soldered in to give more weight to the long arm 44 which acts as a counterweight.

In the recess 36 is provided a check flap 54 which is attached to a hinge pin 56. The flap 54 extends laterally out of the recess 36 and into the slot 34 where it projects into the path of the rotatable gear 38. Below the slot 32, the body 28 is provided with lead shot or BB's 56 placed in individual holes. This shot acts to offset or counterbalance the weight of the Y gear 38, the flap 54 and the brass rods or pins 46 and 56.

In the operation of the device, when the line 12 is being lowered into the water, the beads 22 engage first arm 40 and then arm 42 to operate the Y gear in a clockwise direction. This motion is halted by the check flap 54 when the second bead 22 of that particular cluster engages the arm 42 of the Y gear. This action is illustrated in Figs. 6 and 7. If the cluster is the first cluster on the line, the fishing depth is set at one foot.

To continue to the second foot, the line 12 is slowly raised until the center bead of the cluster is in the top opening of the passage 30. This relieves the pressure on the short arm 42 of the gear and permits the long arm 44 to drop back into its normal depending position. The line is then again lowered and the second bead of the cluster engages the arm 40 and then the third bead engages arm 42 to again rotate the gear 38 clockwise until the long arm 44 again engages flap 54. By this time the lower two beads of the cluster have passed under the gear 38. The same action is then repeated to move the upper bead under the gear 38.

The above-described action is repeated for each foot of line dropped through the float to lengthen the fishing depth.

To raise the line 12 through the float 14, it is merely necessary to pull up on it. The beads 22, in this upward movement, operate the gear 38 in a continuous fashion since the gear 38 can move counterclockwise without interference by the flap 54. The reason for this is that the inner edge of recess 36 acts as a stop for the flap 54 when it is moved in one direction but it is entirely free to move in the opposite direction since the other side of recess 36 is open. Therefore, when it is desired to decrease the fishing depth, the line 12 is pulled up to the desired height and then lowered to permit the balls 22 of the respective cluster to engage the gear 38 with its long arm 44 against flap 54.

The desired fishing depth is easily found by means of recognition of the colors of the balls of the cluster conforming to that depth.

If it is desired to fish at a certain depth and to make the float 14 stay at that point on the line, it is only necessary to turn the float to a horizontal position with the long arm 44 of gear 38 down and the flap 54 hanging downward. The beaded line is then free to pass through the float without the flap 54 interfering with the gear 38. When the desired point on the line is reached, a cork stopper is inserted in both ends of the passage 30 to prevent movement of the float on the line.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fishing float and line depth adjusting assembly comprising a fishing line having a series of bead clusters spaced from each other along said line, each cluster having a plurality of linearly arranged beads, said line being attached at its upper end to a rod and at its lower end to a fish catching means, a float, said float being provided with an open vertical passage extending completely therethrough from the top end to the bottom end, said float being also provided with slots extending transversely to each side of said open vertical passage, said line and said beads extending through said vertical passage in said float, a three-armed Y gear, said Y gear having two small arms and a long arm, pivot means rotatably mounting said Y gear in one of said slots with its path of rotation extending into said vertical passage and so adjacent said vertical passage that at least one of said arms of said Y gear always rotatably extends into said vertical passage to be actuated by the beads as they pass through said vertical passage, said long arm being weighted to form a counterweight, and a check flap extending into the rotational path of said long arm but not of said short arms of said Y gear, said flap being pivotally mounted to permit hinged movement thereof, and stop means on said float to limit movement of said flap and of said long arm in one direction but permit free pivotal movement of said flap beyond the length of said long arm in the opposite direction to permit free rotation of said Y gear in one direction only and prevent complete rotation in the opposite direction.

2. The assembly of claim 1 wherein each of said bead clusters is differentially colored to designate individual fishing depths of said line relative to said float.

3. The assembly of claim 1 wherein said float is provided with counterweight means to counterbalance the weight of said Y gear.

4. The assembly of claim 1 wherein the beads on said line are provided with weight means to cause said beads to sink in water.

5. A fishing float and line depth adjusting assembly comprising a beaded line having a series of clusters of beads thereon spaced predetermined distances apart, each cluster comprising a plurality of spaced, linearly arranged beads, and a float, said float having a through vertical passage to permit said line to pass vertically therethrough, a rotatable stop means in said float intersecting said passage, said stop means being freely rotatable in one rotational direction to permit continuous linear passage of said line and said beads through said float in the vertical up linear direction, means limiting the rotation of said stop means in the opposite rotational direction and cooperating with said beads to permit only intermittent linear passage of said line and said beads in the vertical down linear direction.

6. The assembly of claim 5 wherein said stop means is a rotatable gear having two small arms and a long arm, said long arm having counterweight means thereon to bias it downwardly, and a flap positioned in the rotational path of said long arm, said flap being hinged for free movement in one direction and limited movement in the opposite direction.

7. The assembly of claim 5 wherein each cluster comprises selectively colored beads to designate an individual depth corresponding to each cluster.

References Cited in the file of this patent

UNITED STATES PATENTS

| | | |
|---|---|---|
| 2,597,737 | Kay et al. | May 20, 1952 |
| 2,682,129 | Hamilton | June 29, 1954 |
| 2,809,458 | Wilbourn | Oct. 15, 1957 |